(12) United States Patent
Augustine et al.

(10) Patent No.: US 8,727,702 B2
(45) Date of Patent: May 20, 2014

(54) HOOP SNAP SPACER

(75) Inventors: Scott J. Augustine, Wethersfield, CT (US); David A. Knaul, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 2005 days.

(21) Appl. No.: 12/129,799

(22) Filed: May 30, 2008

(65) Prior Publication Data

US 2009/0297350 A1    Dec. 3, 2009

(51) Int. Cl.
- F01D 5/06 (2006.01)
- F01D 5/08 (2006.01)
- F02C 7/18 (2006.01)

(52) U.S. Cl.
USPC ............. 415/115; 415/199.4; 416/198 A

(58) Field of Classification Search
USPC ............. 415/115, 199.4, 199.5; 416/198 A
See application file for complete search history.

(56) References Cited

U.S. PATENT DOCUMENTS

| | | | | |
|---|---|---|---|---|
| 2,309,878 A | * | 2/1943 | Wiberg | 416/198 R |
| 2,825,124 A | * | 3/1958 | Nichols et al. | 29/889.2 |
| 3,356,339 A | * | 12/1967 | Thomas et al. | 416/244 R |
| 3,868,197 A | * | 2/1975 | Hugoson | 415/199.5 |
| 4,016,636 A | | 4/1977 | Schneider | |
| 4,309,147 A | * | 1/1982 | Koster et al. | 416/95 |
| 4,795,307 A | * | 1/1989 | Liebl | 415/115 |
| 4,901,523 A | | 2/1990 | Huelster | |
| 5,142,859 A | | 9/1992 | Glezer | |
| 5,156,525 A | * | 10/1992 | Ciokajlo | 415/199.5 |
| 5,161,945 A | * | 11/1992 | Clevenger et al. | 415/177 |
| 5,224,822 A | * | 7/1993 | Lenahan et al. | 415/189 |
| 5,350,278 A | * | 9/1994 | Burge | 416/198 A |
| 5,540,552 A | | 7/1996 | Surdi | |
| 5,660,526 A | * | 8/1997 | Ress, Jr. | 416/198 A |
| 5,800,124 A | | 9/1998 | Zelesky | |
| 5,836,742 A | | 11/1998 | Dierksmeier | |
| 6,283,712 B1 | * | 9/2001 | Dziech et al. | 416/179 |
| 6,341,419 B1 | | 1/2002 | Forrester | |
| 6,361,277 B1 | * | 3/2002 | Bulman et al. | 416/96 R |
| 6,406,263 B1 | * | 6/2002 | Meacham et al. | 416/194 |
| 2004/0030666 A1 | | 2/2004 | Marra | |
| 2006/0140756 A1 | | 6/2006 | Schwarz | |

* cited by examiner

*Primary Examiner* — Edward Look
*Assistant Examiner* — Jesse Prager
(74) *Attorney, Agent, or Firm* — Carlson, Gaskey & Olds, PC

(57) ABSTRACT

A mount interface between two rotating gas turbine engine components includes a rigid ring to provide radial deflection restraint. In one example, the rigid ring is comprised of a metal matrix composite material.

23 Claims, 6 Drawing Sheets

Figure 1:
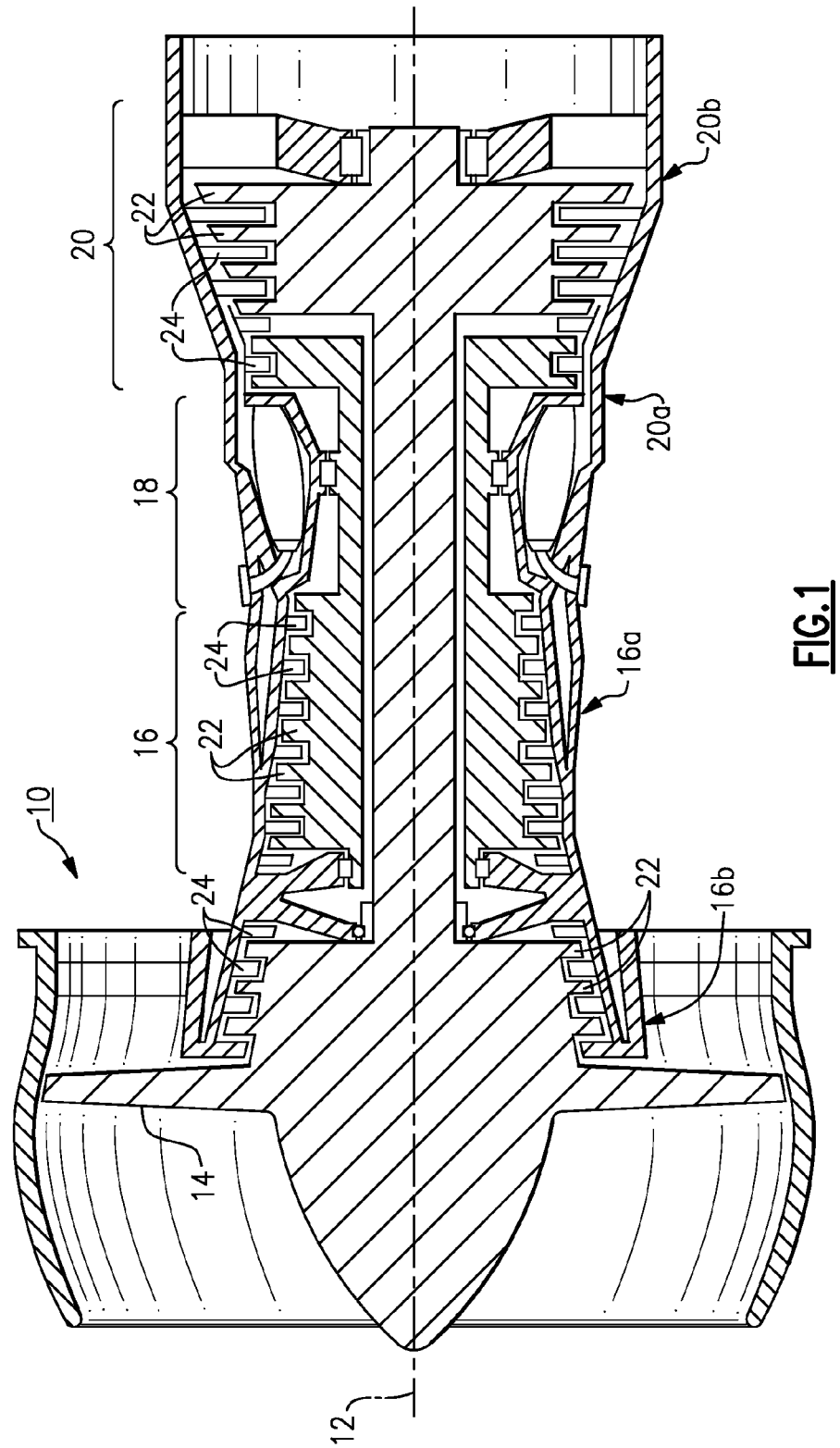
Figure 2:
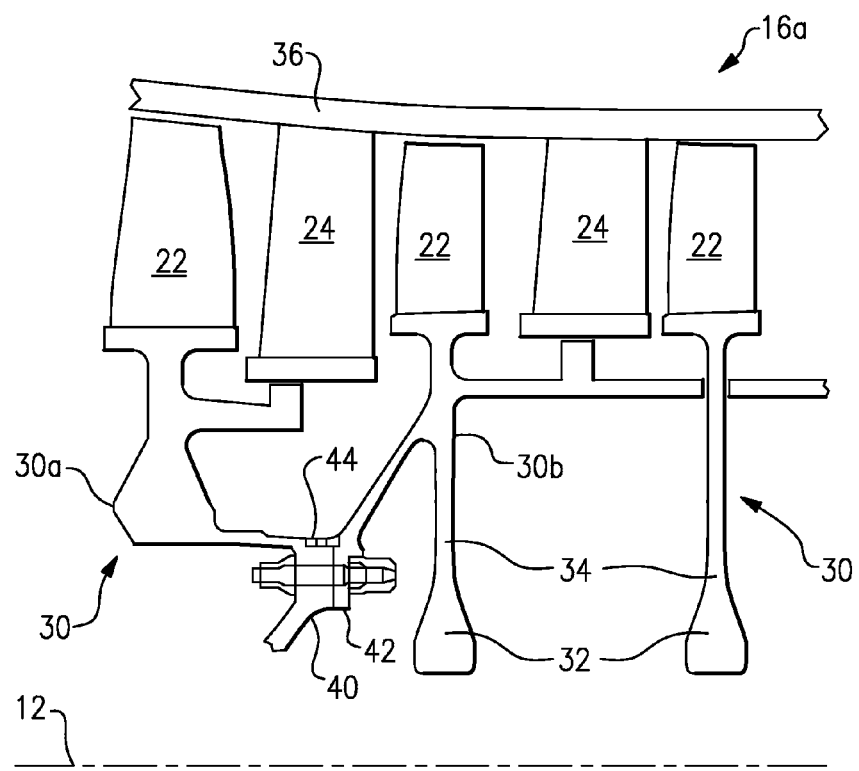
Figure 3:
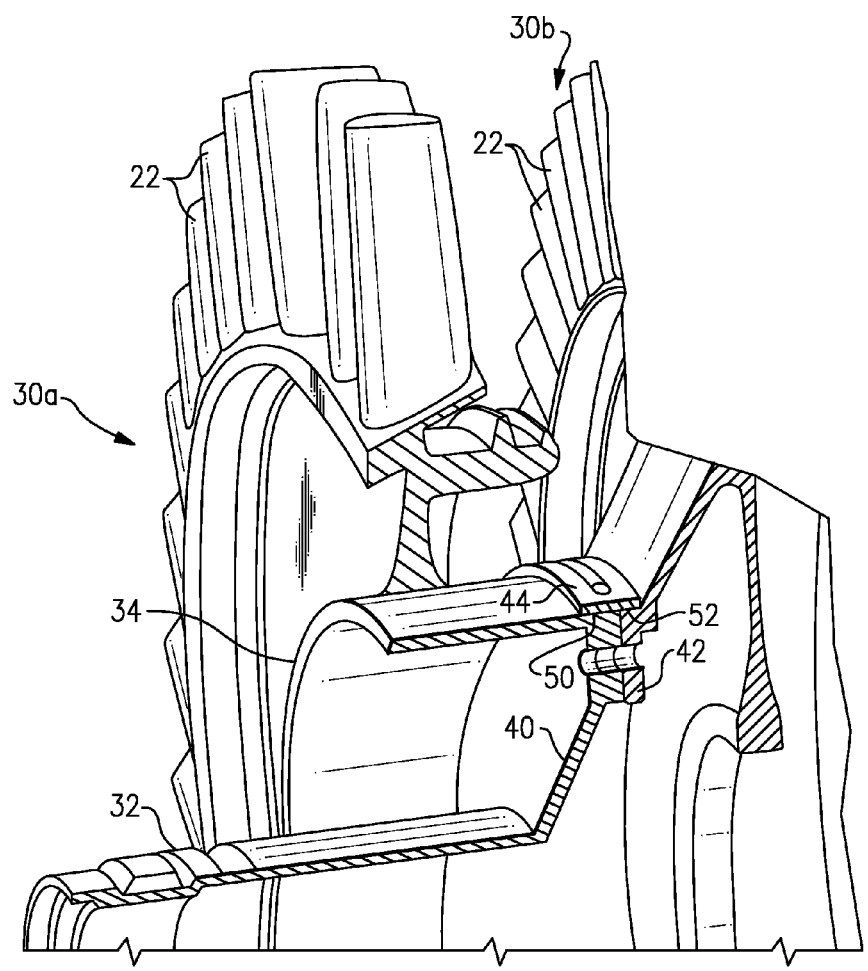

HOOP SNAP SPACER

This invention was made for government support under Contract No. N00019-02-C-3003 awarded by the United States Navy. The government therefore has certain rights in this invention.

BACKGROUND OF THE INVENTION

Gas turbine engine components, such as turbine blades, turbine vanes, compressor blades, compressor vanes, etc., typically operate in a relatively high stress environment. For example, a compressor section of the gas turbine engine includes rotors that are bolted together at a flange interface, which can experience high radial loads during operation.

Traditionally, a first rotor flange is attached to a second rotor flange with a plurality of bolts. The bolts include a center body portion with threaded ends. The first rotor flange includes a plurality of appropriately sized fastener holes that are aligned with corresponding fastener holes in the second rotor flange. The bolts are inserted into the holes such that the center body portions are received in a close fit arrangement with nuts being secured onto the threaded ends of the bolts to secure the rotor flanges together.

The tight fit between the bolts and the fastener holes in the rotor flanges presents challenges from a radial loading aspect. Low cycle fatigue from radial loading can result in undesirable stress concentrations and can lead to premature wear.

Accordingly, there is a need for a mount interface that can open up a tolerance between the center body portion of the bolt and the fastener hole while still providing sufficient structure to accommodate radial loading.

SUMMARY OF THE INVENTION

An example mount interface for a gas turbine engine includes a first rotating engine component having a first mount structure and a second rotating engine component having a second mount structure that faces the first mount structure. A rigid ring surrounds the first and said second mount structures to provide radial deflection restraint.

In one example, the rigid ring comprises a continuous ring-shaped body made from one of a metal, polymer, or ceramic matrix composite material.

In one example, the first and second mount structures comprise rotor stages near a rim.

In another example, the first and second mount structures comprise first and second rotor flanges that are defined by first and second outer peripheral surfaces, respectively, and by first and second inner peripheral surfaces. The rigid ring is received on one of the first and second inner peripheral surfaces or the first and second outer peripheral surfaces.

In one example, at least one of the first and second rotor flanges includes radial slots and the rigid ring includes a plurality of cooling holes that are radially aligned with the radial slots.

In one example, an anti-rotation feature prevents the rigid ring from rotating relative to the first and second rotor flanges.

In one example, at least one of the first and second flanges includes an axial retaining slot that receives the rigid ring. The axial retaining slot prevents the rigid ring from moving axially relative to the first and second rotor flanges.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

FIG. 1 is a schematic view of a gas turbine engine.

FIG. 2 is a cross-sectional view of a high pressure compression section of the gas turbine engine.

FIG. 3 is a partial exploded view of a pair of rotors with a rigid ring.

FIG. 4 is an end view of one of the rotors.

FIG. 5 is a cross-sectional view of a mount interface between the rotors.

FIG. 6 shows an example of an anti-rotation feature.

FIG. 7 shows another example of a rigid ring application.

FIG. 8 shows another example of a rigid ring application.

DETAILED DESCRIPTION OF THE PREFERRED EMBODIMENT

FIG. 1 illustrates selected portions of an example turbine engine 10, such as a gas turbine engine 10 used for propulsion. In this example, the gas turbine engine 10 is circumferentially disposed about an engine centerline 12. The gas turbine engine 10 includes a fan section 14, a compressor section 16, a combustion section 18, and a turbine section 20. The compressor section 16 and the turbine section 20 include corresponding blades 22 and vanes 24. The turbine section 20 includes a high pressure turbine (HPT) section 20*a* and a low pressure turbine (LPT) section 20*b*. Further, the compressor section 16 includes a high pressure compressor (HPC) section 16*a* and a low pressure compressor (LPC) section 16*b*. As is known, air compressed in the compressor section 16 is mixed with fuel and burned in the combustion section 18 to produce hot gasses that are expanded in the turbine section 20.

FIG. 1 is a schematic presentation for illustrative purposes only and is not a limitation on the disclosed examples. Additionally, there are various types of gas turbine engines, many of which could utilize the examples disclosed herein and are not limited to the designs shown.

FIG. 2 shows an upper portion of the HPC section 16*a* in greater detail. A plurality of rotors 30 are coupled together to form the HPC section 16*a*. The rotors 30 each include a center hub 32 and disk 34 that support a set of blades 22 for rotation about the engine centerline 12. Each set of blades 22 is positioned axially between sets of vanes 24 that are mounted to a non-rotating engine structure 36. It should be understood that while only the upper cross-section of the HPC section 16*a* relative to the centerline 12 is shown in FIG. 2, the lower cross-section is similarly configured to that of the upper cross-section as identified components surround the engine centerline 12.

The rotors 30 are mounted to each other at rotor mount interfaces located adjacent to the center hub 32. In one example shown in FIG. 2, a first rotor 30*a* includes a first rotor flange 40 and a second rotor 30*b* includes a second rotor flange 42. The first 40 and second 42 rotor flanges have end faces that abut directly against each other. A hoop snap spacer or stiffened/rigid ring 44 surrounds outer peripheral surfaces of the first 40 and second 42 rotor flanges to provide radial deflection restraint during engine operation.

The mount interface is shown in greater detail in FIGS. 3-5. The rigid ring 44 is comprised of a continuous ring-shaped body, i.e. the ring has an outer circumference that extends completely 360 degrees without having a break or split in the ring. Thus, the rigid ring provides full hoop stiffness. As shown in FIGS. 3-4, the ring-shaped body completely surrounds outer peripheral surfaces 50, 52 of the first 40 and second 42 rotor flanges, respectively. The rigid ring 44 is received on the first 40 and second 42 rotor flanges in an interference fit.

In one example, the rigid ring 44 is made from a high modulus metal matrix composite (MMC) material. One example material is Ti—SiC, however, other materials could also be used. The use of a metal matrix composite is not typical for a rotor alloy; however, this material is used in order to increase circumferential stiffness and to control thermal expansion while minimizing weight. Polymer or ceramic matrix composite materials could also be used.

An end face 54 of the first rotor flange 40 includes a plurality of radial slots 56 (FIG. 4) that extend radially outwardly from the engine centerline 12. The radial slots 56 are circumferentially spaced apart from each other about the engine centerline 12. The radial slots 56 pass secondary air flow into bores of the disk 34.

Figure 4:
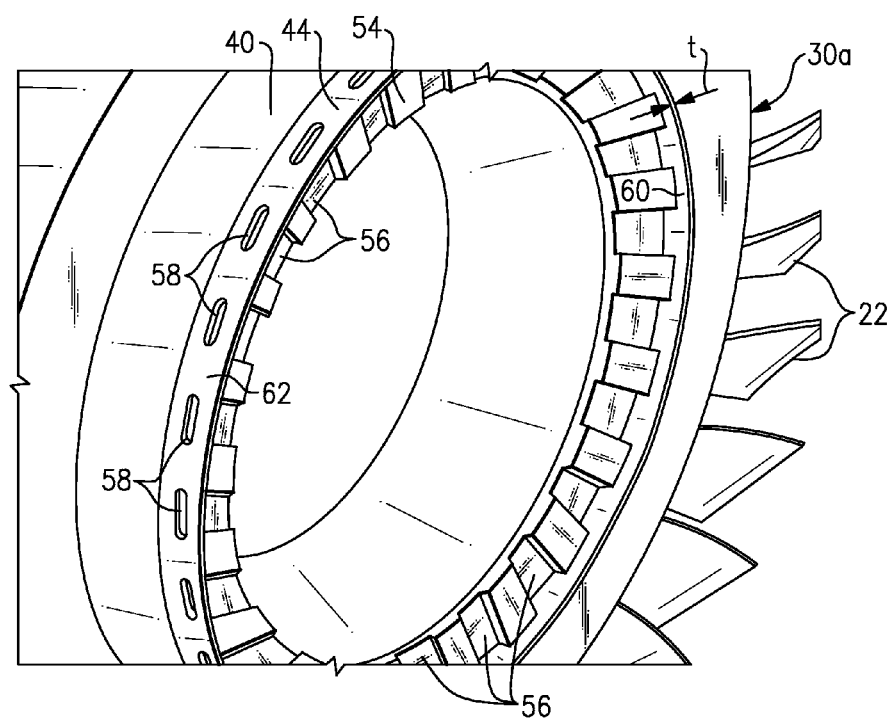

As shown in FIG. 4, the rigid ring 44 includes a plurality of secondary cooling holes 58 that are formed about an outer periphery of the ring 44. The ring 44 is defined by an inner peripheral surface 60 and an outer peripheral surface 62 that are separated by a thickness t. The secondary cooling holes 58 extend through the entire thickness t of the ring 44 from the outer peripheral surface 62 to the inner peripheral surface 60. The secondary cooling holes 58 are shown as having an oval shape, however, other types of hole shapes could be used.

In one example, each secondary cooling hole 58 is at least partially aligned with one radial slot 56. Thus, secondary air flow can easily pass through the rigid ring 44. It should be understood that radial slots could also be formed within the second rotor flange 42 in addition to, or instead of, the radial slots in the first rotor flange 40.

Figure 5:
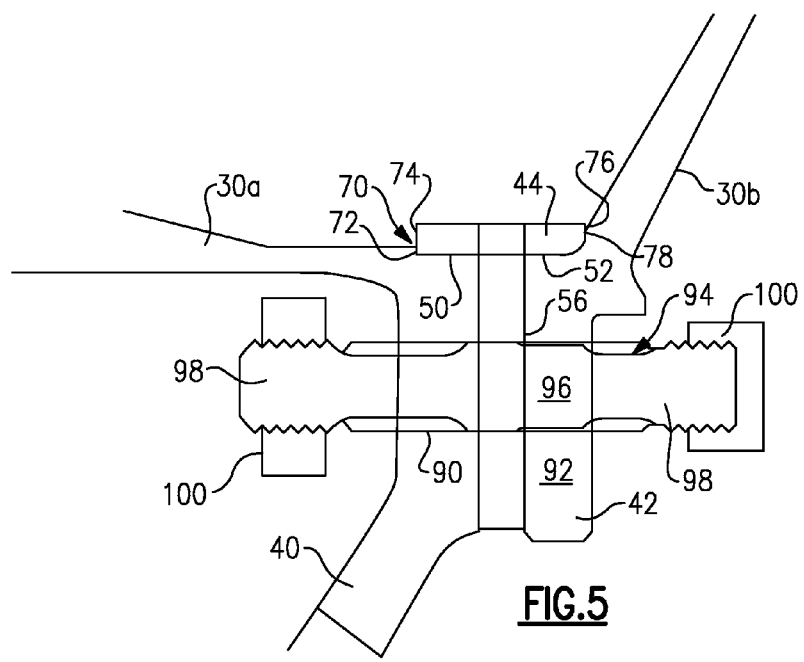

As shown in FIG. 5, an axial retaining feature 70 is used to hold the ring 44 in place. The axial retaining feature 70 includes a slot or feature that is machined into the outer peripheral surfaces 50, 52 of the first 40 and second 42 rotor flanges. This slot provides a lip or wall portion 72 that engages one edge 74 of the ring 44. An opposite edge 76 of the ring 44 is retained against a wall portion 78 of the second rotor flange 42. The axial retaining feature 70 prevents the ring 44 from moving axially relative to the first 40 and second 42 rotor flanges in a direction along the engine centerline 12.

Figure 6:
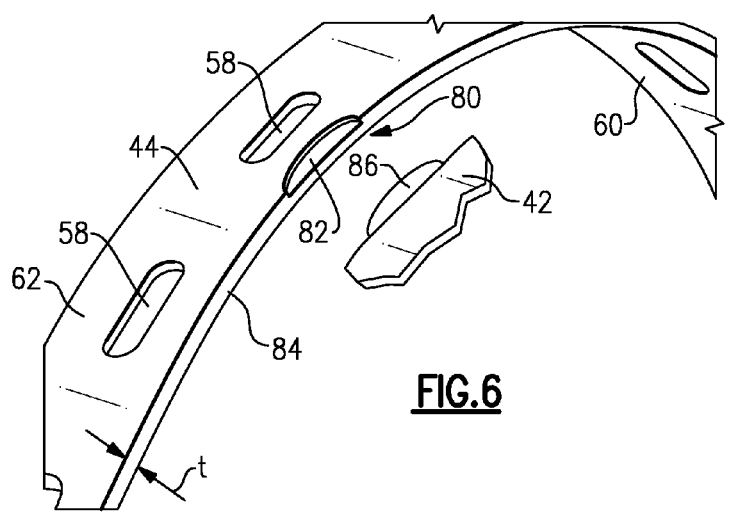

As shown in FIG. 6, an anti-rotation feature 80 is included on the rigid ring 44. In one example, the anti-rotation feature 80 comprises a female portion 82 that is formed along one edge 84 of the ring 44 in one of the inner 60 or outer 62 peripheral surfaces. A male portion 86 associated with the one of the first 40 or second 42 rotor flanges is received within the female portion 82. The anti-rotation feature 80 prevents the ring 44 from rotating relative to the first 40 and second 42 rotor flanges during engine operation. Further, the anti-rotation feature 80 is positioned adjacent to one of the secondary cooling holes 58. As such, the anti-rotation feature 80 assists in ensuring that the secondary cooling holes 58 are maintained in proper alignment with the radial slots 56. While only one anti-rotation feature 80 is shown, additional anti-rotation features could also be utilized as needed. Further, the male and female portions could be reversed with the female portion being formed on one of the first and second rotor flanges and the male portion being formed on the ring.

During assembly, the rigid ring 44 is slid onto the second rotor flange 42 of the second rotor 30b and then the first rotor 30a is assembled onto the second rotor 30b and fastened in place. The first rotor flange 40 includes a first plurality of fastener holes 90 and the second rotor flange 42 includes a second plurality of fastener holes 92 that are aligned with the first plurality of fastener holes 90 when the end faces of the first 40 and second 42 rotor flanges are in abutting contact. Fasteners 94 are then inserted into the fastener holes 90, 92.

An example of one fastener 94 is shown in greater detail in FIG. 5. Each fastener 94 includes a central body portion 96 that is located within the fastener holes 90, 92 and threaded end portions 98 that extend outwardly beyond the first 40 and second 42 rotor flanges. Nuts 100 are threaded onto the threaded end portions 98.

The use of the ring 44 in an interference fit around the first 40 and second 42 rotor flanges allows the internal fit between the central body portion 96 and the fastener holes 90, 92 to be slightly loosened, i.e. the tolerance between the body portion 96 and the fastener holes 90, 92 can be opened up because this interface no longer has to accommodate radial loading. This reduces wear at the fastener interface with the flanges.

However, the ring 44 can be used with existing fasteners 94 as shown in FIG. 5 such that the ring can be retro-fit into existing engines with minimal impact. The axial retaining feature would be machined into the outer peripheral surfaces of the first and second rotor flanges, the ring would be installed, and then the fasteners would be installed. Optionally, for new configurations, less complex fasteners could be used with a generally straight cylindrical body extending between the threaded ends. This configuration would significantly reduce the cost of the fasteners.

As such, with minimal changes to existing configurations, the rigid ring 44 fully accommodates the radial loading while allowing the tolerance between the fastener central body portions and the associated fastener holes to be increased. It should also be understood that while the ring is shown as being used to provide a radial coupling between two rotor flanges, the ring could also be used to provide coupling for other types of engine components.

For example, a hoop snap spacer or rigid ring 200 (FIG. 7) could be used as a spacer providing connection between rotor stages 202a, 202b near a rim 204 where the blades 22 are supported. The rigid ring 200 in this example ties the rotor stages 202a, 202b together via friction rather than bolts.

With prior known spacers at this interface, the main spacer body is positioned outboard of a radius at which it can support itself under centrifugal loads. As such these prior known spacers include hook features that snap underneath the rim of the adjoining rotor stages. This requires the disks to be made larger to have the necessary strength to hold onto the spacer.

Figure 7:
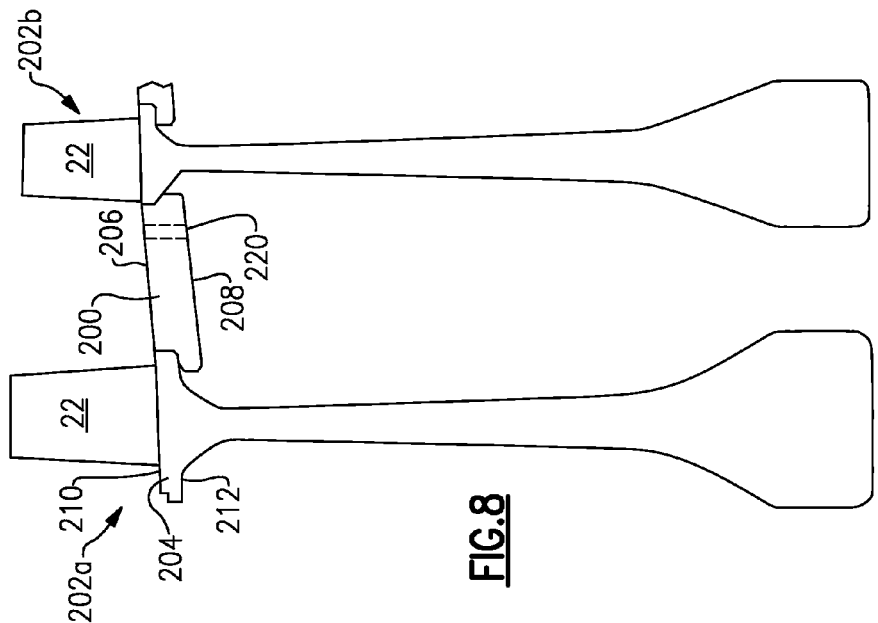

The rigid ring 200 takes advantage of the higher strength and modulus of the MMC material as described above. The rigid ring 200 includes an outer circumferential surface 206 and an inner circumferential surface 208. The rim 204 includes an outer circumferential surface 210 and an inner circumferential surface 212. The rigid ring 200 is fit onto the outer circumferential surface 210. An axial retention feature 214 prevents the rigid ring 200 from moving axially relative to the rim 204. The axial retention feature 214 could comprise a slot machined into the outer circumferential surface 210 as shown in FIG. 7, for example.

This rigid ring 200 can support itself at a larger radius and can accordingly be snapped on an outer diameter side of the disks. As such, radial loads are minimized for the disks.

Figure 8:
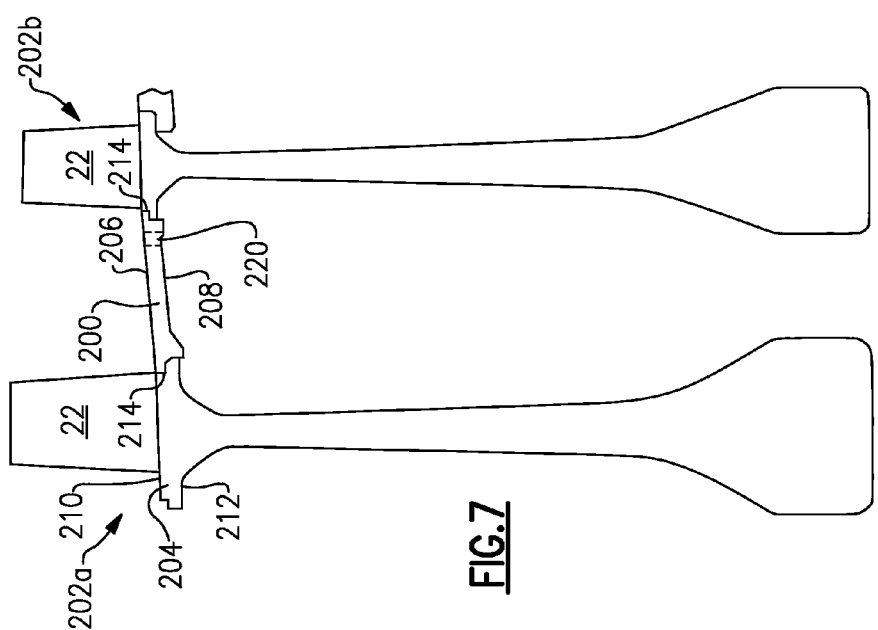

Optionally, the rigid ring 200 could be snapped underneath the rim as shown in FIG. 8 to engage the inner circumferential surface 212. In this configuration the rigid ring would take advantage of the improved material properties, which would allow the ring to be thinner. This would reduce the load on the disk to allow disk weight reduction. Further, in this configuration the size of the disks would be increased to provide the necessary strength to hold onto the ring.

In either configuration, slots or holes 220 could be machined or molded into the ring 200 to improve air flow. Scallops or other anti-rotation features, as discussed above, could also be incorporated as necessary to prevent the ring from rotating relative to the rim.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A mount interface for a gas turbine engine component comprising:
   a first rotating engine component having a first mount structure;
   a second rotating engine component having a second mount structure facing said first mount structure;
   a rigid ring surrounding said first and said second mount structures to provide radial deflection restraint; and
   an axial retaining feature that prevents said rigid ring from moving axially relative to said first and second rotating engine components in a direction along a rotational axis, said axial retaining feature comprising a slot formed in an outer or inner peripheral surface of said first and second rotating engine components, and said slot including a first wall portion that abuts directly against one edge of said rigid ring and a second wall portion that abuts directly against an opposite edge of said rigid ring.

2. The mount interface according to claim 1 wherein said rigid ring comprises a continuous ring-shaped body made from one of a metal matrix composite, a polymer matrix composite, or a ceramic matrix composite.

3. The mount interface according to claim 1 wherein said first mount structure comprises a first flange defined by a first outer peripheral surface and said second mount structure comprises a second flange defined by a second outer peripheral surface, said first and said second flanges abutting against each other with said rigid ring completely surrounding said first and said second flanges at said first and said second outer peripheral surfaces.

4. The mount interface according to claim 3 wherein said rigid ring is received in a close fitting arrangement on said first and said second outer peripheral surfaces.

5. The mount interface according to claim 3 wherein said first and said second flanges and said rigid ring rotate together about an axis, and wherein at least one of said first and said second flanges includes an axial retaining slot that receives said rigid ring, said axial retaining slot being formed at a corresponding one of said first and said second outer peripheral surfaces to prevent said rigid ring from moving relative to said first and said second flanges in an axial direction along said axis.

6. A mount interface for a gas turbine engine component comprising:
   a first rotating engine component having a first mount structure, said first mount structure comprises a first flange defined by a first outer peripheral surface;
   a second rotating engine component having a second mount structure facing said first mount structure, said second mount structure comprises a second flange defined by a second outer peripheral surface;
   a rigid ring surrounding said first and said second mount structures to provide radial deflection restraint, said first and said second flanges abutting against each other with said rigid ring completely surrounding said first and said second flanges at said first and said second outer peripheral surfaces, and wherein at least one of said first and said second flanges includes radial cooling slots, and wherein said rigid ring includes a plurality of secondary cooling holes formed about an outer periphery of said rigid ring with at least one secondary cooling hole being radially aligned with a corresponding one of said radial cooling slots.

7. The mount interface according to claim 6 wherein said rigid ring includes at least one anti-rotation feature to prevent said rigid ring from rotating relative to said first and said second flanges.

8. The mount interface according to claim 7 wherein said at least one anti-rotation feature comprises one of a male and female member that cooperates with the other of said male and said female member that is associated with one of said first and said second flanges.

9. The mount interface according to claim 3 wherein said first and said second flanges comprise first and second rotor flanges associated with respective first and second rotor stages each supporting a plurality of blades for rotation about an axis.

10. The mount interface according to claim 3 wherein said first and said second flanges and said rigid ring rotate together about an axis, and wherein said first flange includes a first plurality of fastener holes spaced circumferentially apart from each other about said axis and said second flange includes a second plurality of fastener holes spaced circumferentially apart from each other about said axis, said first and second plurality of fastener holes being aligned with each other, and including a plurality of fasteners received within said first and said second pluralities of fastener holes to secure said first and said second flanges together.

11. The mount interface according to claim 1 said first mount structure comprises a first rotor rim portion defined by a first outer peripheral surface and a first inner peripheral surface, and said second mount structure comprises a second rotor rim portion defined by a second outer peripheral surface and a second inner peripheral surface, said first and said second rotor rim portions being spaced apart from each other such that said rigid ring engages one of said first and said second outer peripheral surfaces or said first and said second inner peripheral surfaces.

12. A gas turbine engine comprising: a fan; a combustor section positioned aft of the fan; a turbine section positioned aft of the combustor section; and a compressor section wherein air compressed in the compressor section is mixed with fuel and burned in the combustor section to produce gases that are expanded in the turbine section, the compressor section including a plurality of rotors that rotate about an engine axis, said plurality of rotors including a first rotating component with a first mount structure and a second rotating component having a second mount structure to be associated with said first mount structure, wherein at least one of said first and said second rotating components includes cooling slots formed in a fore or aft end face of said one of said first and second rotating components and extending radially outwardly away from said engine axis; and a rigid ring cooperating with said first and said second mount structures to provide radial restraint, wherein said rigid ring includes a plurality of secondary cooling holes formed about an outer peripheral surface of said rigid ring and being spaced radially outwardly of said cooling slots, and with at least one secondary cooling hole being radially aligned with a corresponding one of said cooling slots.

13. The gas turbine engine according to claim 12 wherein said first rotating component comprises a first rotor flange and said second rotating component comprises a second rotor flange facing said first rotor flange, and wherein said rigid ring surrounds outer peripheral surfaces of said first and said second rotor flanges to provide radial deflection restraint.

14. The gas turbine engine according to claim 13 wherein said rigid ring comprises a continuous ring-shaped body comprised of a metal matrix material, said ring-shaped body being received on said first and said second rotor flanges in an interference fit.

15. The gas turbine engine according to claim 13 wherein at least one of said first and said second rotor flanges includes an axial retaining slot that receives said rigid ring, said axial retaining slot being formed in a corresponding one of said outer peripheral surfaces to prevent said rigid ring from moving relative to said first and said second rotor flanges in an axial direction along said engine axis.

16. A gas turbine engine comprising:
a fan;
a combustor section positioned aft of the fan;
a turbine section positioned aft of the combustor section; and
a compressor section wherein air compressed in the compressor section is mixed with fuel and burned in the combustor section to produce gases that are expanded in the turbine section, the compressor section including a plurality of rotors that rotate about an engine axis, said plurality of rotors including a first rotating component with a first mount structure and a second rotating component having a second mount structure to be associated with said first mount structure, and wherein said first rotating component comprises a first rotor flange and said second rotating component comprises a second rotor flange facing said first rotor flange; and
a rigid ring cooperating with said first and said second mount structures to provide radial restraint, wherein said rigid ring surrounds outer peripheral surfaces of said first and said second rotor flanges to provide radial deflection restraint, and wherein at least one of said first and said second rotor flanges includes radial cooling slots extending in a direction radially away from said engine axis, and wherein said rigid ring includes a plurality of secondary cooling holes formed about an outer periphery of said rigid ring with at least one secondary cooling hole being radially aligned with a corresponding one of said radial cooling slots.

17. The gas turbine engine according to claim 13 wherein said rigid ring includes at least one anti-rotation feature that prevents said rigid ring from rotating relative to said first and said second rotor flanges, and wherein said at least one anti-rotation feature comprises one of a male and female member that cooperates with the other of said male and said female member that is associated with one of said first and said second rotor flanges.

18. The gas turbine engine according to claim 12 wherein said first rotating component comprises a first rotor rim portion and said second rotating component comprises a second rotor rim portion to be coupled to said first rotor rim portion, and wherein said rigid ring engages one of outer peripheral surfaces of said first and said second rotor rim portions or inner peripheral surfaces of said first and said second rotor rim portions.

19. The gas turbine engine according to claim 12 wherein said rigid ring comprises a continuous ring-shaped body made from one of a metal matrix composite, a polymer matrix composite, or a ceramic matrix composite.

20. A gas turbine engine comprising:
a fan;
a combustor section positioned aft of the fan;
a turbine section positioned aft of the combustor section; and
a compressor section wherein air compressed in the compressor section is mixed with fuel and burned in the combustor section to produce gases that are expanded in the turbine section, the compressor section including a plurality of rotors that rotate about an engine axis, said plurality of rotors including a first rotating component with a first mount structure and a second rotating component having a second mount structure to be associated with said first mount structure;
a rigid ring cooperating with said first and said second mount structures to provide radial restraint; and
an axial retaining feature that prevents said rigid ring from moving axially relative to said first and second rotating components in a direction along said engine axis, said axial retaining feature comprising a slot formed in an outer or inner peripheral surface of said first and second rotating components, and said slot including a first wall portion that abuts directly against one edge of said rigid ring and a second wall portion that abuts directly against an opposite edge of said rigid ring.

21. A mount interface for a gas turbine engine component comprising:
a first rotating engine component having a first mount structure;
a second rotating engine component having a second mount structure facing said first mount structure, wherein said first and second rotating engine components rotate about an engine axis, and wherein at least one of said first and said second rotating engine components includes cooling slots formed in a fore or aft end face of said one of said first and second rotating engine components and extending radially outwardly away from said engine axis and
a rigid ring surrounding said first and said second mount structures to provide radial deflection restraint, wherein said rigid ring comprises a continuous ring-shaped body made from one of a metal matrix composite, a polymer matrix composite, or a ceramic matrix composite, and wherein said rigid ring includes a plurality of secondary cooling holes formed about an outer peripheral surface of said rigid ring and being spaced radially outwardly of said cooling slots, and with at least one secondary cooling hole being radially aligned with a corresponding one of said cooling slots.

22. A mount interface for a gas turbine engine component comprising:
a first rotating engine component having a first mount structure that comprises a first flange defined by a first outer peripheral surface;
a second rotating engine component having a second mount structure facing said first mount structure, and wherein said second mount structure comprises a second flange defined by
a second outer peripheral surface;

a rigid ring surrounding said first and said second mount structures to provide radial deflection restraint, said first and said second flanges abutting against each other with said rigid ring completely surrounding said first and said second flanges at said first and said second outer peripheral surfaces, and wherein at least one of said first and said second flanges includes radial cooling slots, and wherein said rigid ring includes a plurality of secondary cooling holes formed about an outer periphery of said rigid ring with at least one secondary cooling hole being radially aligned with a corresponding one of said radial cooling slots, and wherein said first and said second pluralities of fastener holes are circumferentially spaced apart from each other and are located between adjacent radial cooling slots; and wherein said first and said second flanges and said rigid ring rotate together about an axis, and wherein said first flange includes a first plurality of fastener holes spaced circumferentially apart from each other about said axis and said second flange includes a second plurality of fastener holes spaced circumferentially apart from each other about said axis, said first and second plurality of fastener holes being aligned with each other, and including a plurality of fasteners received within said first and said second pluralities of fastener holes to secure said first and said second flanges together.

23. The gas turbine engine according to claim 16 wherein said first and said second rotor flanges and said rigid ring rotate together about an axis, and wherein said rigid ring fits against the outer peripheral surface of said first and said second rotor flanges, and wherein said first rotor flange includes a first plurality of fastener holes spaced circumferentially apart from each other about said axis and said second rotor flange includes a second plurality of fastener holes spaced circumferentially apart from each other about said axis, said first and second plurality of fastener holes being aligned with each other, and including a plurality of fasteners received within said first and said second pluralities of fastener holes to secure said first and said second rotor flanges together, and wherein said first and said second pluralities of fastener holes are circumferentially spaced apart from each other and are located between adjacent radial cooling slots.

* * * * *